United States Patent Office 2,965,596
Patented Dec. 20, 1960

2,965,596

POLYETHYLENE COATING FOR GLASSWARE AND GLASS COATED THEREWITH

John M. Sharf, Lancaster, Pa., assignor to Armstrong Cork Company, Lancaster, Pa., a corporation of Pennsylvania No Drawing. Filed May 20, 1958, Ser. No. 736,450

4 Claims. (Cl. 260—29.6)

This invention relates to a protective coating for glassware and more particularly to a protective coating which will render the surface of glassware receptive to label adhesive.

In the manufacture of glass containers such as food containers and the like, it is desirable to apply a protective coating to the exterior surface of the glassware to protect it from marring while passing through the manufacturing equipment and also through the food processing equipment. Due to the means used to transfer the glassware from one processing station to another, it is desirable that the exterior surface be lubricated to a certain extent to facilitate sliding movement of the glassware in chutes and on conveyors, etc. Excessive lubrication is objectionable for the reason that it may cause glass jars to be ejected from a line of jars being moved sequentially by a pusher engaging only the end jar.

The protective coating should ultimately be water-insoluble so as to remain on the glass after subjecting it to rinsing and retort processing because after the jars are filled and retorted or pasteurized they are moved over various types of equipment. It is also necessary that the coating be such that it renders the surface of the glass container hydrophilic and receptive to conventional label adhesives so that labels can be attached to the containers and remain securely attached thereto for reasonable commercial life.

Due to the fact that during the application of the coating to the exterior surface of the glassware it is possible that a small amount of the coating could enter the mouth of the glassware, it is essential that the coating be harmless if admixed with the contained foods.

Several different types of coatings have been used. For example, the complex stearate soap type coatings are satisfactory from a lubrication standpoint and also from a protective standpoint when immediately applied; however, such coatings are soluble in water and are removed when the ware is subjected to rinsing and particularly retorting. Silicone coatings have also been used to a certain extent for this purpose; and while these have the desirable properties from the standpoint of water-insolubility, lubrication, and protection, these films form a continuous hydrophobic surface on the glassware and the conventional label adhesives will not adhere.

An object of this invention is to provide a protective coating for glassware which will also serve as a proper lubricant to facilitate movement over equipment in subsequent processing steps.

Another object of this invention is to provide glassware which is resistant to damage caused by rubbing against the ware and also moves freely through the processing equipment.

A still further object is to provide glassware having a protected surface to which a conventional label can be adhesively secured.

It has been found that a coating made from a certain class of dispersed paraffinic waxes, particularly the polyethylene waxes, has the desired properties to overcome the disadvantages enumerated above. The wax is dispersed in water and should, for best ultimate performance, have a melting point in excess of the boiling point of water. The polyethylene waxes having a molecular weight around 5,000 are best suited for carrying out this invention. Polyethylene waxes ranging between molecular weights of 1,500 to 10,000 may be used. However, if the molecular weight is 10,000 or over, the wax has a tendency to decompose rather than melt upon the application of heat at atmospheric pressure. If the molecular weight is lower than 1,500, the melting point of the wax may be less than the boiling point of water and is, therefore, non-persistent. The particular wax selected should be capable of melting at normal atmospheric pressures. While polyethylene wax is preferred, desirable results can be obtained with any of the waxy materials which have the representative ethylene linkage.

To form an aqueous emulsion of the polyethylene wax, a suitable stabilizing agent is added during the dispersing step. Desirable emulsions can be formed by the use of oleic acid and a strong alkaline earth hydroxide of which potassium hydroxide or sodium hydroxide is typical in combination with the other ingredients. In forming the emulsion, it is preferable that an excess of alkali be added to the soap so formed in an amount ranging from 10%–50%.

The most satisfactory dispersions of this type are formed by adjusting the pH during the dispersion to 10 or greater. Triethanolamine is suitable for carrying out this purpose because of its high degree of surface activity and because it can easily be removed by a suitable buffering agent during the drying of the film so as to render the dried film free of the dispersing agent which might lend undesirable properties to the final product if not completely removed. The dispersion proceeds most uniformly if the waxy substances are slightly oxidized and have an apparent acid number ranging between 10 and 20. In some instances a wider range between 5 and 20 has been found to be satisfactory for carrying out this purpose. In addition to triethanolamine other ammoniacal compounds such as ammonia water, diethanolamine, and monoethanolamine may be used. However, it has been found that triethanolamine aids in controlling the particle size of the wax.

Since it is essential to have a hydrophilic surface on the glassware for the adhesion of a label, and since it is also desirable to drive off the triethanolamine during drying and reduce the pH of the coating to near neutral somewhere between pH 6.5 and pH 8, it has been found that both of these functions can be performed by the addition of complex phosphate salts such as tetrasodium pyrophosphate or a mixture of dihydrogen and monohydrogen potassium or sodium phosphate. These salts insure the decomposition and removal of the ammoniacal dispersing agent during the drying of the film on the container and also aid in the application of a thin, uniform, free-flowing film on the glass. These complexing salts persist and drive off the fugitive triethanolamine buffering the composition to a pH of 6.5 to 8. The potassium or sodium ion, being a high surface energy positive ion, attaches itself firmly to the glass surface forming a surface with zeolitic activity. It appears also that this activity may interfere with the uniform distribution of the wax causing it to appear in small isolated plaques separated by the strong positive ion areas. This results in a surface having a micelle formation in which the receptive positive ion areas possess the desired hydrophilic properties for labeling and the plaques of wax serve to protect the underlying glass from mechanical marring.

This results in a coating having nominal solids of about 20% which is then diluted in the range of 400:1 for application as a fine spray or fog to the glass container.

The following example is typical of a formulation suitable for carrying out this invention:

Example

| | |
|---|---|
| Polyethylene #629 pounds | 1.6 |
| Potassium soap formed from oleic acid and potassium hydroxide (10%–50% excess potassium hydroxide) ounces | 5.25 |
| Triethanolamine do | 4.7 |
| Tetrasodium pyrophosphate do | 2.5 |

The polyethylene wax, potassium soap, and triethanolamine are added to sufficient hot water to form a dispersion having a solids content of about 20%. The complex tetrasodium pyrophosphate is then added to this dispersion, and the entire mass is diluted about 400 to 1 before application to the ware.

Tests indicate that the bottles and jars so treated handle satisfactorily not only on the manufacturing equipment but on the packaging equipment as well and that the labels adhere satisfactorily to the treated surface during reasonable commercial life.

I claim:

1. A nonseizing coating for glassware comprising an aqueous dispersion of polyethylene having a molecular weight ranging between 1500 and 10,000, an ammoniacal emulsifying agent for the polyethylene selected from the group consisting of triethanolamine, ammonia water, diethanolamine and monoethanolamine, an alkali soap having excess alkalinity formed from oleic acid and an alkali selected from the group consisting of sodium hydroxide and potassium hydroxide, and an alkaline phosphate buffering agent selected from the group consisting of tetrasodium pyrophosphate, mixtures of dihydrogen and monohydrogen potassium phosphate, and mixtures of dihydrogen and monohydrogen sodium phosphate.

2. A nonseizing coating for glassware comprising an aqueous dispersion of polyethylene having a molecular weight ranging between 1500 and 10,000, said dispersion containing approximately 20% solids, ammoniacal emulsifying agent selected from the group consisting of triethanolamine, ammonia water, diethanolamine and monoethanolamine, an alkali soap having excess alkalinity formed from oleic acid and an alkali selected from the group consisting of potassium hydroxide and sodium hydroxide, and a buffering agent selected from the group consisting of tetrasodium pyrophosphate, mixtures of dihydrogen and monohydrogen potassium phosphate and mixtures of dihydrogen and monohydrogen sodium phosphate.

3. A glass container having a coating formed from the dried residue of an aqueous dispersion of polyethylene having a molecular weight ranging between 1500 and 10,000, an ammoniacal emulsifying agent for the polyethylene selected from the group consisting of triethanolamine, ammonia water, diethanolamine and monoethanolamine, an alkali soap having excess alkalinity formed from oleic acid and an alkali selected from the group consisting of sodium hydroxide and potassium hydroxide, and a buffering agent selected from the group consisting of tetrasodium pyrophosphate, mixtures of dihydrogen and monohydrogen potassium phosphate and mixtures of dihydrogen and monohydrogen sodium phosphate.

4. A glass container having a coating formed from the dried residue of an aqueous dispersion of polyethylene having a molecular weight ranging between 1500 and 10,000, triethanolamine emulsifying agent for the polyethylene, an alkali soap formed from oleic acid and an excess of sodium hydroxide, and tetrasodium pyrophosphate to serve as a buffering agent to remove the triethanolamine as the film dries.

References Cited in the file of this patent

UNITED STATES PATENTS

| | | |
|---|---|---|
| 2,068,424 | Mark | Jan. 19, 1937 |
| 2,290,794 | Alvarado | July 21, 1942 |
| 2,462,390 | Harmon | Feb. 22, 1949 |
| 2,766,214 | Erchak | Oct. 9, 1956 |